United States Patent [19]

Schmitt

[11] Patent Number: 5,219,223
[45] Date of Patent: Jun. 15, 1993

[54] WHISK

[76] Inventor: Jürgen Schmitt, Geisdörfle 1, D-7596, Seebach, Fed. Rep. of Germany

[21] Appl. No.: 839,576

[22] Filed: Feb. 21, 1992

[30] Foreign Application Priority Data

Mar. 16, 1991 [DE] Fed. Rep. of Germany ... 9103238[U]

[51] Int. Cl.⁵ .............................................. B01F 13/00
[52] U.S. Cl. .................................... 366/129; 416/69; 416/70 R; 416/227 R; D7/690
[58] Field of Search ............... 416/69, 70 R, 227 R, 416/231 A; 366/129, 130, 342–344; 15/141.1, 141.2; 99/348; D7/376, 379, 380, 412, 688, 690

[56] References Cited

U.S. PATENT DOCUMENTS

| D. 143,247 | 12/1945 | Storm | D7/690 |
| 434,635 | 8/1990 | Gregg | 15/141.1 |
| 592,559 | 10/1987 | Bennett | 15/141.1 |
| 1,617,787 | 2/1927 | Andrews, Jr. | 15/141.1 |
| 1,713,876 | 5/1929 | Knuppe | 366/129 X |
| 1,722,104 | 7/1929 | Miner | D7/690 X |
| 1,986,163 | 1/1935 | Rockwell | 416/70 |
| 3,441,254 | 4/1969 | Merke, Jr. | 416/227 R |

FOREIGN PATENT DOCUMENTS

| 303063 | 1/1918 | Fed. Rep. of Germany | 15/141.1 |
| 3225450 | 1/1984 | Fed. Rep. of Germany | 366/343 |

Primary Examiner—Philip R. Coe
Assistant Examiner—Charles Cooley
Attorney, Agent, or Firm—Collard & Roe

[57] ABSTRACT

A whisk having a longitudinally extending handle with a front end. Several wire loops with open free ends extend from the front end of the handle and form a V-shape. Several rectilinear parts connect the open free ends of the V. The whisk is adapted to contact a large surface of the bottom of a flat-bottomed container and reach into the corners of the container.

7 Claims, 2 Drawing Sheets

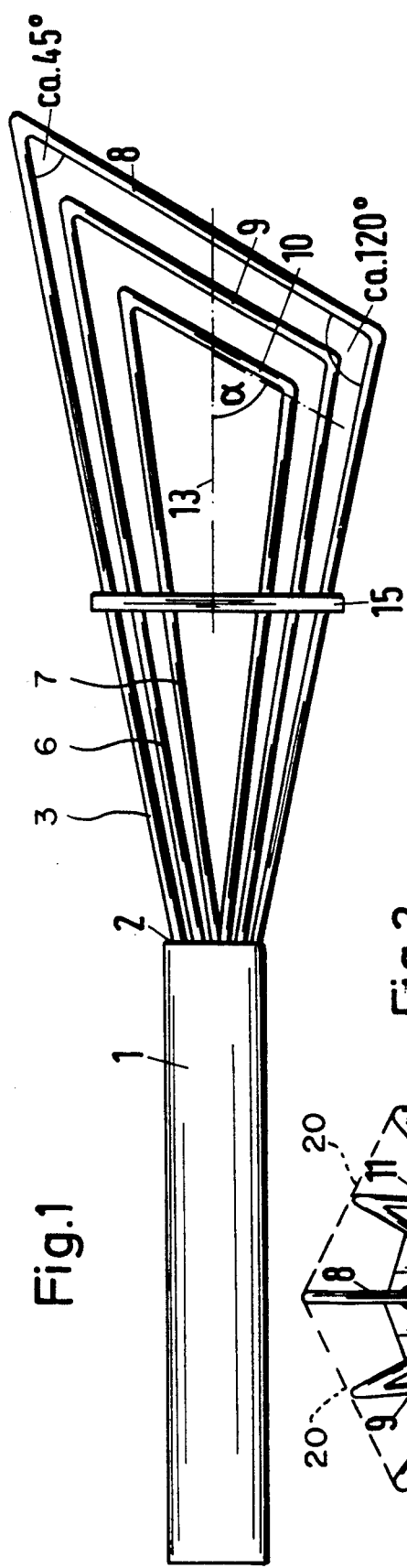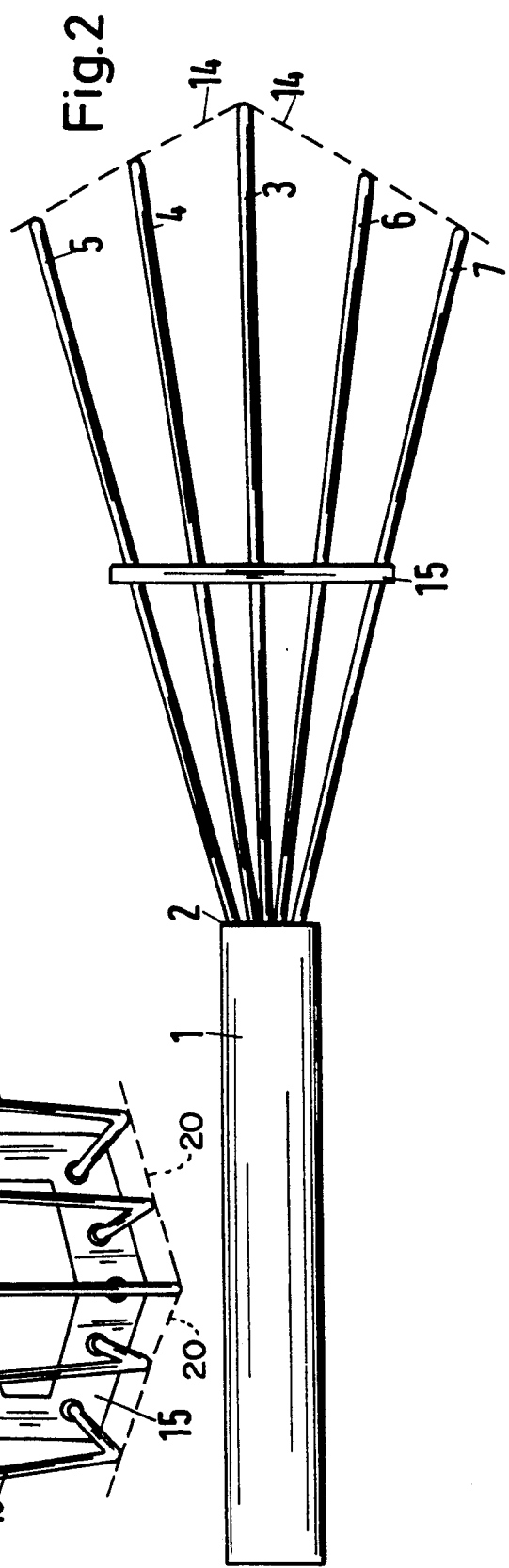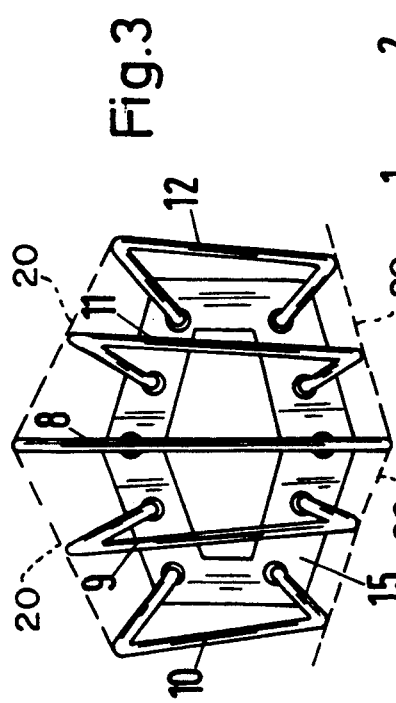

WHISK

BACKGROUND OF THE INVENTION

1. Field of the Invention

The invention relates to a whisk for beating or whipping eggs, cream, etc. It includes a handle and several wire loops which extend from the front end of the handle.

2. Description of the Prior Art

Whisks for beating heavy cream, sauces, eggs or similar materials are known in which the wire loops have a round or oval shape. Therefore, these whisks can only be used efficiently in bowls or pots having a rounded or ball-shaped bottom. When containers with flat bottoms are used, the known whisks have the disadvantage that they cannot reach into the corners between the bottom surface and the side wall. Thus, unbeaten food remains in the corners. When beating Hollandaise sauce, for example, the results of the whipping process may be unsatisfactory.

SUMMARY OF THE INVENTION

It is an object of the present invention to provide a whisk which overcomes the drawbacks of the prior art and allows complete whipping of materials in flat-bottom containers.

The object is achieved by a whisk having a longitudinally extending handle with a front end. Several wire loops extend from the front end of the handle and form a V-shape. Several rectilinear parts connect the open ends of the V.

The whisk according to the invention has the substantial advantage that, due to the rectilinear parts, the whisks rests on a large area of the flat-bottom surface of a container. During beating or whipping, the whisk reaches into the corner between the bottom surface and the wall of the container.

The several rectilinear parts may form an angle in the range of 30° to 60° with respect to a longitudinal axis of the handle. In this manner, the whisk reaches all areas of the container during the usual operation of the whisk.

The several wire loops include a middle wire loop and lateral wire loops. The middle wire loop being the longest wire loop and the lateral wire loops being progressively shorter, so that the ends of the several wire loops are aligned along two lines which intersect at the end of the middle wire loop. With this embodiment, the whisk provides even better penetration into the corner of the container.

The several rectilinear parts include a middle rectilinear part and lateral rectilinear parts. The middle rectilinear part corresponds to the middle wire loop and the lateral rectilinear parts correspond to the lateral wire loops. The middle rectilinear part is the longest, and the lateral rectilinear parts are progressively shorter. In this manner, the ends of the several rectilinear parts are aligned along two lines which intersect at the end of the middle rectilinear part.

The whisk may also include at least one anchoring rim having bore holes to support the several wire loops. The several wire loops include upper and lower members. The lower members form an angle of approximately 120° with the several rectilinear parts. The upper members form an angle of approximately 45° with the several rectilinear parts. The middle wire loop thus forms the largest triangular configuration with the lateral wire loops having smaller but similar triangular configurations.

The whisk may also have a coupling with a front end to connect the whisk to a motor. Several symmetrical wire loops may extend from the front end of the coupling, forming a V-shape. Several symmetrical rectilinear parts may connect the open ends of the V.

BRIEF DESCRIPTION OF THE DRAWINGS

Other objects and features of the present invention will become apparent from the following detailed description considered in connection with the accompanying drawing which discloses one embodiment of the present invention. It should be understood, however, that the drawing is designed for the purpose of illustration only, and not as a definition of the limits of the invention.

In the drawing, wherein similar reference characters denote similar elements throughout the several views:

FIG. 1 is a side elevational view of a whisk according to the invention;

FIG. 2 is a top plan view thereof;

FIG. 3 s a front side view thereof; and

DETAILED DESCRIPTION OF THE PREFERRED EMBODIMENT

Figure 4:
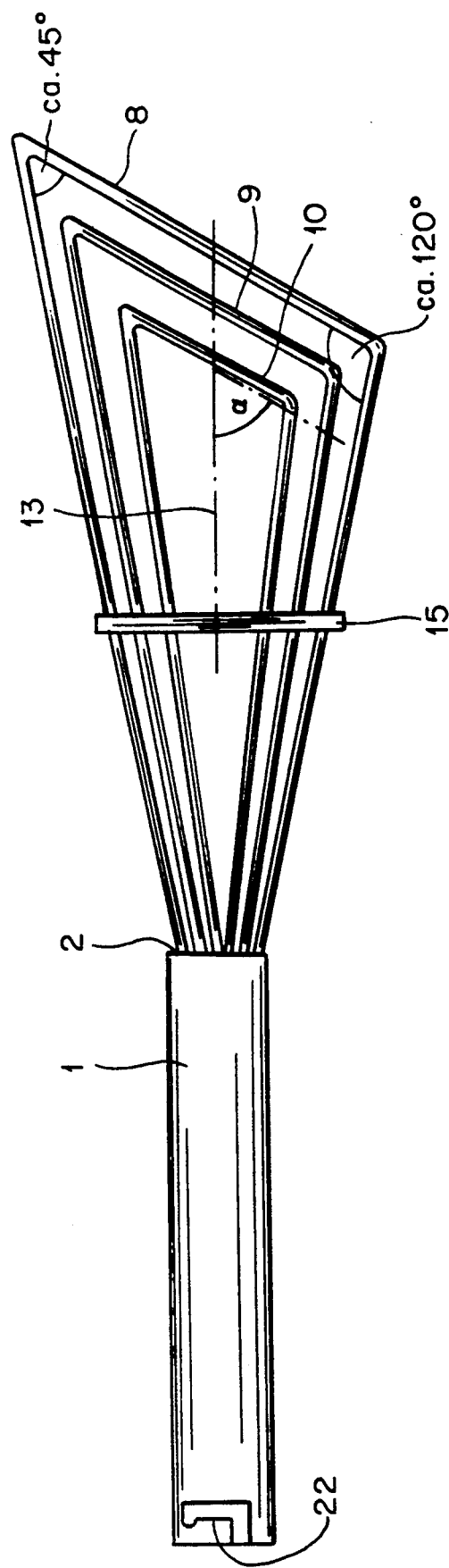
FIG. 4 is a side elevational view of a whisk with a coupling.

Referring now in detail to the drawing and, in particular, to FIGS. 1, 2 and 3, there is shown a whisk according to the invention including a handle 1 which can be made of metal, wood or plastic, for example. Several wire loops 3, 4, 5, 6 and 7 extend from a front end 2 of handle 1. Wire loops 3, 4, 5, 6 and 7 have a V-like shape. Connecting the open free ends of the V is a rectilinear or nearly rectilinear part 8, 9, 10, 11, 12. For example, part 8 connects the open free ends of wire loop 3. The open free ends of wire loops 4, 5, 6 and 7 are connected by parts 9, 10, 11 and 12. The angle formed between rectilinear part 8, 9, 10, 11 and 12 and a longitudinally extending central axis 13 of handle 1 is in the range of 30° to 60°.

As can be seen in FIG. 2, middle wire loop 3 has the greatest length. The lengths of lateral wire loops 4, 6 and 5, 7 are progressively shorter so that the outer ends of the wire loops are aligned along dotted line 14.

In addition the middle rectilinear part 8 has the greatest length, as can be seen in FIGS. 1 and 3. Parts 9, 11 and 10, 12 are progressively shorter so that the ends of rectlinear parts 8, 9, 10, 11 and 12 are aligned along dotted line 20.

The wire loops can be kept in position by an anchoring rim 15 which is provided with bore holes through which wire loops 3, 4, 5, 6 and 7 extend. In a particularly advantageous embodiment, the angle between the lower part of the wire loop and part 8, 9, 10, 11 and 12 is obtuse, about 120°. The angle between the upper part of the wire loop and part 8, 9, 10, 11 and 12 is acute, about 45°. The middle wire loop 3 is largest and outer wire loops 4, 6 and 5, 7 are progressively smaller, but have the same angle with respect to parts 9, 11 and 12, 10.

The whisk according to the invention also can be formed symmetrically, whereby a coupling 22 or an electric drive can be provided instead of the handle. In this manner, the whisk can also be operated by a motor.

What is claimed is:

1. A whisk for use in flat-bottomed containers, comprising:
   a longitudinally extending handle having a front end;
   several pairs of wires, each pair having
   (i) a first member with a first end attached to said front end of said handle and a second free end; and
   (ii) a second member shorter than said first member, with a first end attached to said front end of said handle and a second free end, each pair of wires forming a V-shape with said second free ends at the open part of the V; and
   several rectilinear parts, one rectilinear part being connected between said second free ends of one pair of wires to form a loop, each first member forming an angle of approximately 45° with the one rectilinear part connected to it, each second member forming an angle of approximately 120° with the one rectilinear part connected to it, said rectlinear parts resting on the flat bottom of the container and, during use, reaching into a corner of the container.

2. A whisk for use in flat-bottomed containers, comprising:
   a longitudinally extending coupling having a longitudinally axis, a back end to connect the whisk to a motor and a front end;
   several pairs of wires, each pair having
   (i) a first member with a first end attached to said front end of said coupling and a second free end; and
   (ii) a second member shorter than said first member, with a first end attached to said front end of said coupling and a second free end, each pair of wires forming a V-shape with said second free ends at the open part of the V; and
   several rectilinear parts, open rectilinear part being connected between said second free ends of one pair of wires to form a loop, said second member being shorter than said first member, such that said several rectilinear parts form an angle in the range of 30° to 60° with respect to the longitudinal axis of said coupling, each first member forming an angle of approximately 45° with the one rectilinear part connected to it, so that said rectilinear parts rest on the flat bottom of the container and, during use, reach into the corner of the container.

3. A whisk for use in flat-bottomed containers comprising:
   a longitudinally extending handle having a longitudinal axis and a front end;
   several pairs of wires, each pair having
   (i) a first member with a first end attached to said front end of said handle and a second free end; and
   (ii) a second member shorter than said first member, with a first end attached to said front end of said handle and a second free end, each pair of wires forming a V-shape with said second free ends at the open part of the V, said several pairs of wires including a middle pair and lateral pairs, said middle pair being the longest and said lateral pairs being progressively shorter so that the free ends of said first and second members of said several pairs are aligned along lines which intersect at the free ends of said middle pair;
   several rectilinear parts, one rectilinear part being connected between said second free ends of one pair of wires to form a loop, said second member being shorter than said first member, such that said several rectilinear parts form an angle in the range of 30° to 60° with respect to the longitudinal axis of said handle, each first member forming an angle of approximately 45° with the one rectlinear part connected to it, so that said rectilinear parts rest on the flat bottom of the container and, during use, reach into the corner of the container.

4. The whisk according to claim 3, wherein said several rectilinear parts include a middle rectilinear part corresponding to said middle pair of wires and lateral rectilinear parts corresponding to said lateral pairs of wires, said middle rectilinear parts being progressively shorter, so that the ends of said rectilinear parts are aligned along lines which intersect at the ends of said middle rectilinear part.

5. The whisk according to claim 3, additionally including
   at least one anchoring rim having a plurality of holes to support said several pairs of wires.

6. The whisk according to claim 3, wherein each second member forms an angle of approximately 120° with the one rectilinear part connected to it.

7. The whisk for use in flat bottomed containers comprising:
   a longitudinally extending coupling having a longitudinal axis, a back end to connect the whisk to a motor and a front end;
   several pairs of wires, each pair having
   (i) a first member with a first end attached to said front end of said coupling and a second free end; and
   (ii) a second member shorter than said first member, with a first end attached to said front end of said coupling and a second free end, each pair of wires forming a V-shape with said second free ends at the open part of the V, said several pairs of wires including a middle pair and lateral pairs, said middle pair being the longest and said lateral pairs being progressively shorter so that the free end of said first and second members of said several pairs are aligned along lines which intersect at the free ends of said middle pair;
   several rectilinear parts, one rectilinear part connected between said second free ends of one pair of wires to form a loop, said second member being shorter than said first member, such that said several rectilinear parts form an angle in the range of 30° to 60° with respect to the longitudinal axis of said coupling, each first member forming an angle of approximately 45° with the one rectlinear part connected to it, so that said rectilinear parts rest on the flat bottom of the container and, during use, reach into the corner of the container.

* * * * *